(12) United States Patent
Mugrauer

(10) Patent No.: US 11,873,883 B2
(45) Date of Patent: Jan. 16, 2024

(54) GEAR FOR A FLAPPING WING AIRCRAFT

(71) Applicant: Festo SE & Co. KG, Esslingen (DE)

(72) Inventor: Rainer Mugrauer, Schlaitdorf (DE)

(73) Assignee: Festo SE & Co. KG, Esslingen (DE)

( * ) Notice: Subject to any disclaimer, the term of this patent is extended or adjusted under 35 U.S.C. 154(b) by 456 days.

(21) Appl. No.: 17/306,323

(22) Filed: May 3, 2021

(65) Prior Publication Data

US 2021/0341042 A1  Nov. 4, 2021

(30) Foreign Application Priority Data

May 4, 2020 (DE) ...................... 10 2020 205 601.3

(51) Int. Cl.
*F16H 21/52* (2006.01)
*B64C 33/02* (2006.01)

(52) U.S. Cl.
CPC ............. *F16H 21/52* (2013.01); *B64C 33/02* (2013.01)

(58) Field of Classification Search
CPC ................................ F16H 21/52; B64C 33/02
See application file for complete search history.

(56) References Cited

U.S. PATENT DOCUMENTS

| 4,139,171 A * | 2/1979 | Harris ..................... B64C 33/00 244/22 |
| 8,336,809 B2 | 12/2012 | Muren |
| 2006/0169070 A1 * | 8/2006 | Kawaai ................... F16H 21/52 74/25 |

FOREIGN PATENT DOCUMENTS

| CN | 108528711 A | 9/2018 |
| DE | 102013004188 A1 | 9/2014 |

* cited by examiner

*Primary Examiner* — William C Joyce
(74) *Attorney, Agent, or Firm* — Hoffmann & Baron, LLP

(57) ABSTRACT

Gear for a flapping wing aircraft, having a gearwheel support, on which a gearwheel is mounted so as to be rotatably movable about a gearwheel axis, which gearwheel is connected in a rotationally fixed manner to a crankshaft, which has a central section extending coaxially to the gearwheel axis and end regions adjoining the central section on both sides, the end regions each delimiting an angle between 0 degrees and 90 degrees with the central section and engage in a guide slot of an associated joint part which is mounted pivotably movable about a pivot axis on a joint support which is connected to the gearwheel support and which is mounted pivotably movable about a respective support axis on the gearwheel support wherein the joint supports are connected to a coupling strut and wherein an actuator, which is motion-coupled to the coupling strut, is arranged on the gearwheel support.

9 Claims, 4 Drawing Sheets

GEAR FOR A FLAPPING WING AIRCRAFT

BACKGROUND OF THE INVENTION

The invention relates to a gear for a flapping wing aircraft, comprising a gearwheel support on which a gearwheel is mounted so as to be rotatable about a gearwheel axis, comprising a crankshaft which is connected to the gearwheel in a rotationally fixed manner and which has a central section extending coaxially with the gearwheel axis and end regions adjoining the central section on both sides, wherein the central section passes through the gearwheel and wherein the end regions are arranged with an angle between 0 degrees and 90 degrees with the central section and wherein each of the end regions engages in a guide slot of an associated, in particular arcuate, joint part which is mounted pivotably about a pivot axis on a joint support, which is connected to the gearwheel support, wherein each of the joint supports is mounted pivotably about a respective support axis on the gearwheel support.

From DE 10 2013 004 188 A1, a coupling device for movably connecting two components is known. This coupling device comprises a first joint part for attachment to a first component and a second joint part for attachment to a second component, wherein the joint parts are pivotably connected to one another and wherein, for a movement coupling of the first joint part to the second joint part, a crankshaft is provided which is mounted in the first joint part rotatably about an axis of rotation and which is coupled to the second joint part, wherein a force transmission is provided between the crankshaft and the second joint part at a coupling point.

SUMMARY OF THE INVENTION

The object of the invention is to provide a gear having a simplified structure.

This task is solved for the gear of the type mentioned at the beginning with the following features:

It is provided that the joint supports are connected to a coupling strut, wherein an actuator for providing an actuating movement is arranged on the gearwheel support, which is motion-coupled to the coupling strut.

The function of the coupling strut is to synchronize the pivoting movements that the joint supports can perform about the respective support axis relative to the gearwheel support. By way of example, it is provided that the gearwheel support is provided with two joint supports and that the coupling strut is pivotally coupled to the two joint supports respectively. Preferably, a pivot pin is formed on each of the joint supports in extension of the pivot axis, which pivot pin engages in a suitable recess of the coupling strut or is provided with a joint ball which is received in a suitable recess of the coupling strut.

It is further provided that the coupling strut is associated with an actuator which is designed to initiate a pivoting movement or a linear movement on the coupling strut. Preferably, the actuator is an electric geared motor comprising an output shaft to provide a pivoting movement. The output shaft can either be directly connected to the coupling strut or is provided with a control lever which is coupled to the coupling strut. The actuator may, for example, be connected to control electronics which are adapted to receive wirelessly transmitted control signals from a remotely located remote control, thereby allowing the actuator to be influenced without contact by a user who operates the remote control.

In the case of a direct coupling of the output shaft of the actuator, which is designed as an electric geared motor, with the coupling strut, the actuator, which is mounted on the gearwheel support, can initiate a pivoting movement on the coupling strut. Preferably, a motion coupling of the actuator with the coupling strut and a motion coupling of the coupling strut with the joint supports are matched to each other in such a way that an actuating motion of the actuator leads to a pivoting motion of the two link supports in opposite directions by the same angular amount respectively. Hereby, when the gear is used in a flapping wing aircraft, an advantageous influence can be taken on a flight direction of the flapping wing aircraft, if it is further assumed that each of the joint parts is coupled to a flapping wing which is designed to generate lift forces and propulsion forces for the flapping wing aircraft.

Advantageous further embodiments of the invention are the subject of the sub-claims.

According to the invention the pivot axis delimits an angle between 70 degrees and 90 degrees with the gearwheel axis and/or that the support axis makes an angle between 0 degrees and 30 degrees with the gearwheel axis and/or that the support axis is arranged parallel to the gearwheel axis at a distance, which distance may be almost zero or is zero. If the pivot axis is aligned transversely to the gearwheel axis, i.e. at an angle of 90 degrees, it can be assumed that an oscillating pivoting movement of the joint part about the pivot axis with a sinusoidal speed curve occurs during a uniform rotational movement of the crankshaft about the gearwheel axis. A change in the angle between the swivel axis and the gearwheel axis, assuming a uniform rotational movement of the crankshaft about the gearwheel axis, results in differences in the speed characteristics for the swivel movements of the joint part in the two opposite swivel directions. These different speed characteristics can be used, for example, to optimize the flapping characteristics of flapping blades that are coupled to the joint parts. Similarly, this applies in the case of a deviation from a parallel, in particular coaxial, alignment of the support axis relative to the gearwheel axis. Provided that the support axis is aligned parallel to the gearwheel axis, the adjustment of the distance between the support axis and the gearwheel axis provides a further possibility for influencing the velocity profile for the joint part relative to the support part, to achieve an optimization of the flapping course for flapping wings connected to the joint parts.

According to a further embodiment of the invention, it is provided that the coupling strut is arranged on a bearing journal of the gearwheel support so as to be pivotally movable about a journal axis aligned transversely to the gearwheel axis, the journal axis intersecting the gearwheel axis. Preferably, it is provided that the journal axis centrally intersects a spacing line between the two pivot axes of the joint parts. Furthermore, it is preferably provided that the distances between the gearwheel axis and the coupling points of the coupling strut are identical to the respective joint part. As a result, a pivoting movement of the coupling strut about the pivot axis, which is effected by the actuator, can result in a pivoting movement of the two support parts in opposite directions about the respective support axes, preferably with an identical angular amount.

In a further embodiment of the invention, it is provided that the actuator has a pivoted lever which is connected in an articulated manner to the coupling strut via a control strut. Preferably, the actuator is an electric motor with gear transmission and the pivoted lever is fixed to an output shaft of the gear transmission and accordingly performs the desired pivoting movement upon rotation of the electric motor. The control strut can be designed, for example, as a push-pull rod and, depending on an attachment to the swivel lever as well as to the coupling strut, enables an adjustment of a movement ratio or movement reduction between the swivel movement of the swivel lever and the swivel movement of the coupling strut.

It is advantageous if the gearwheel support is provided on opposite outer surfaces with bearing journals aligned parallel, in particular coaxially, to the gearwheel axis and through which the crankshaft passes, wherein the joint support is mounted on the bearing journal so that it can pivot. Preferably, the bearing journal and the joint support form a sliding bearing with which the pivotable mounting of the joint support on the gearwheel support is ensured. Preferably, locking means corresponding to one another are provided on the bearing journal and on the joint support, with which a positive coupling can be realized between the bearing journal and the joint support in the direction of the gearwheel axis.

It is expedient if the joint supports are accommodated at a fixed distance from one another on the gearwheel support and/or that the joint supports are accommodated on the gearwheel support so as to be exclusively pivotable. These measures can ensure a design of the components for the gear which allow an advantageous manufacturing of these components. Accordingly, the joint supports have only exactly one rotational degree of freedom of movement with respect to the gearwheel support, while the joint supports have no translational degree of freedom of movement with respect to the gearwheel support. By this renunciation of adjustment possibilities, the manufacturability and the stability of the gear are positively influenced. In addition it may be provided that the joint member is mounted on the joint support so as to be exclusively pivotable about the pivot axis.

In an advantageous further embodiment of the invention, it is provided that the guide slot of the joint part is of groove-shaped design and is penetrated by the end region of the crankshaft. Preferably the guide slot has a rectangular cross section in a cross-sectional plane aligned transversely to the extent of the end region. The groove-shaped design of the guide slot ensures positive coupling with the joint device for each rotational position of the crankshaft. The end region of the crankshaft is always in contact with a, preferably flat, side wall of the guide slot, and no evasive movement of the end region out of the guide slot is provided during intended use of the gear. The rectangular design of the guide slot, in conjunction with the preferably arcuate design of the joint part, ensures a preferably at least nearly sinusoidal movement profile for the joint part during a rotational movement of the crankshaft.

In a further embodiment of the invention, it is provided that a sectional plane aligned transversely to the pivot axis and comprising the gearwheel axis is at a distance, in particular a distance being almost zero or being zero, from a center of the guide slot. This ensures that, at a constant rotational speed for the crankshaft, the respective swivel movements of the joint parts in opposite directions are carried out with an at least almost identical speed profile. This applies in particular to the case where a distance between the sectional plane and the center of the guide slot disappears. In an alternative embodiment, it can be provided that by specifying a distance between the sectional plane and the center of the guide slot, an influence is exerted on the speed curves for the swiveling movements of the joint parts in opposite directions. This applies in particular if an adjustment means is provided for this distance.

BRIEF DESCRIPTION OF THE DRAWINGS

The invention is explained in more detail below with reference to the accompanying drawing. Here shows.

DETAILED DESCRIPTION

Figure 1:
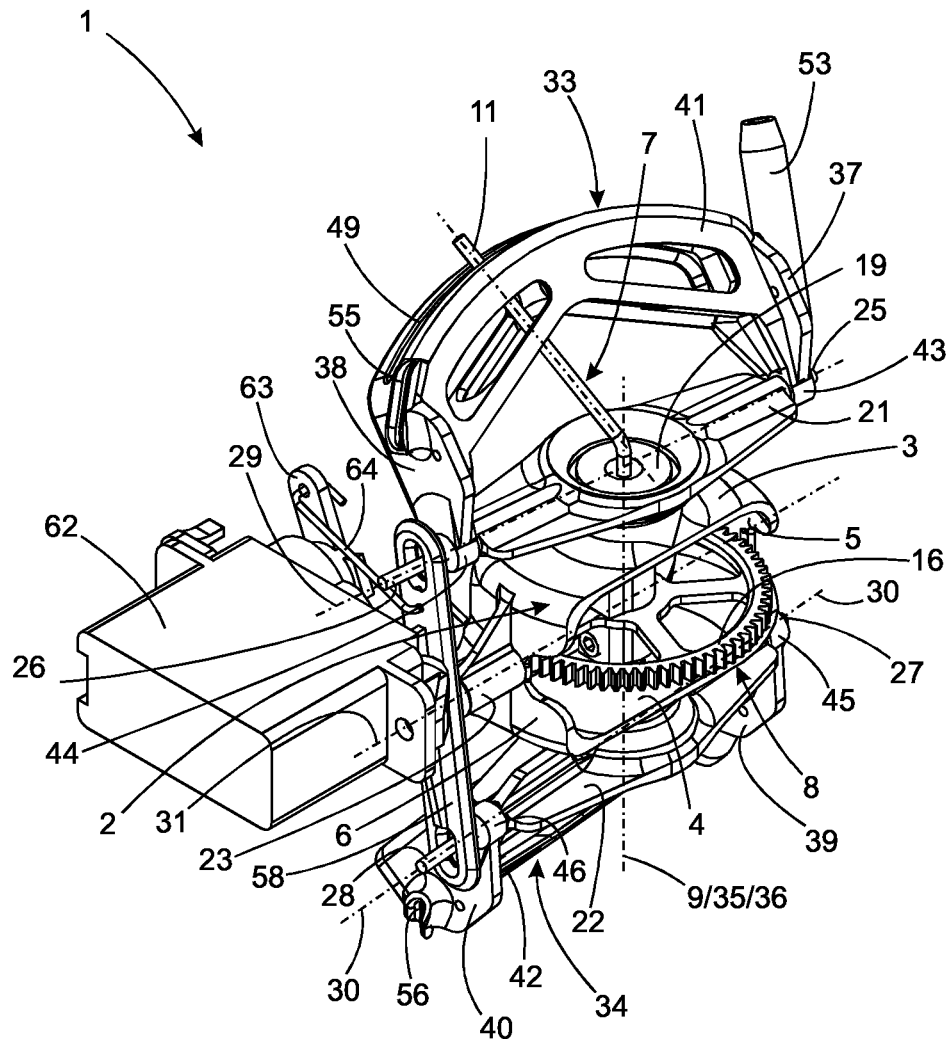
FIG. 1 a perspective view of a gear for a flapping wing aircraft.

A gear 1 shown in FIGS. 1 to 4 is provided for use in a flapping-wing aircraft, in particular an ornithopter, which is not shown in more detail. This flapping-wing aircraft may in particular be a near-natural model of a bird which can be operated and controlled, for example, by means of an electric drive which is not shown and a radio remote control device which is also not shown.

The task of the gear 1 is to convert a rotational movement of a drive motor (not shown), in particular an electric motor, into a sequence of upstroke movements and downstroke movements of joint parts 33, 34, which are pivotably mounted on a gearwheel support 2 of the gear 1 respectively. The joint parts 33, 34 can in turn be provided with wings (not shown), which can be modelled like bird wings, in order to be able to provide lift forces as well as propulsion forces for the flapping wing aircraft (not shown) within the scope of the upstroke movements and downstroke movements of the joint parts 33, 34.

The gearwheel support 2 is formed as a profiled part with a substantially rectangular profiling and comprises a first side wall 3, a second side wall 4, a front wall 5 and a rear wall 6. The first side wall 3 and the second side wall 4 are penetrated by a central section 15 of a crankshaft 7, which extends rectilinearly along a gearwheel axis 9 and to which a gearwheel 8 is fixed. The central section 15 of the crankshaft 7 defines the orientation of the gearwheel axis 9, which is a geometrical reference, in particular as a rotation axis of the gearwheel 8.

In this connection, a gear rim 16 of the gearwheel 8 is aligned at least substantially parallel to the first and second side walls 3, 4 of the gearwheel support 2 and has a diameter which corresponds at least approximately with a distance between the front wall 5 and the rear wall 6.

Figure 2:
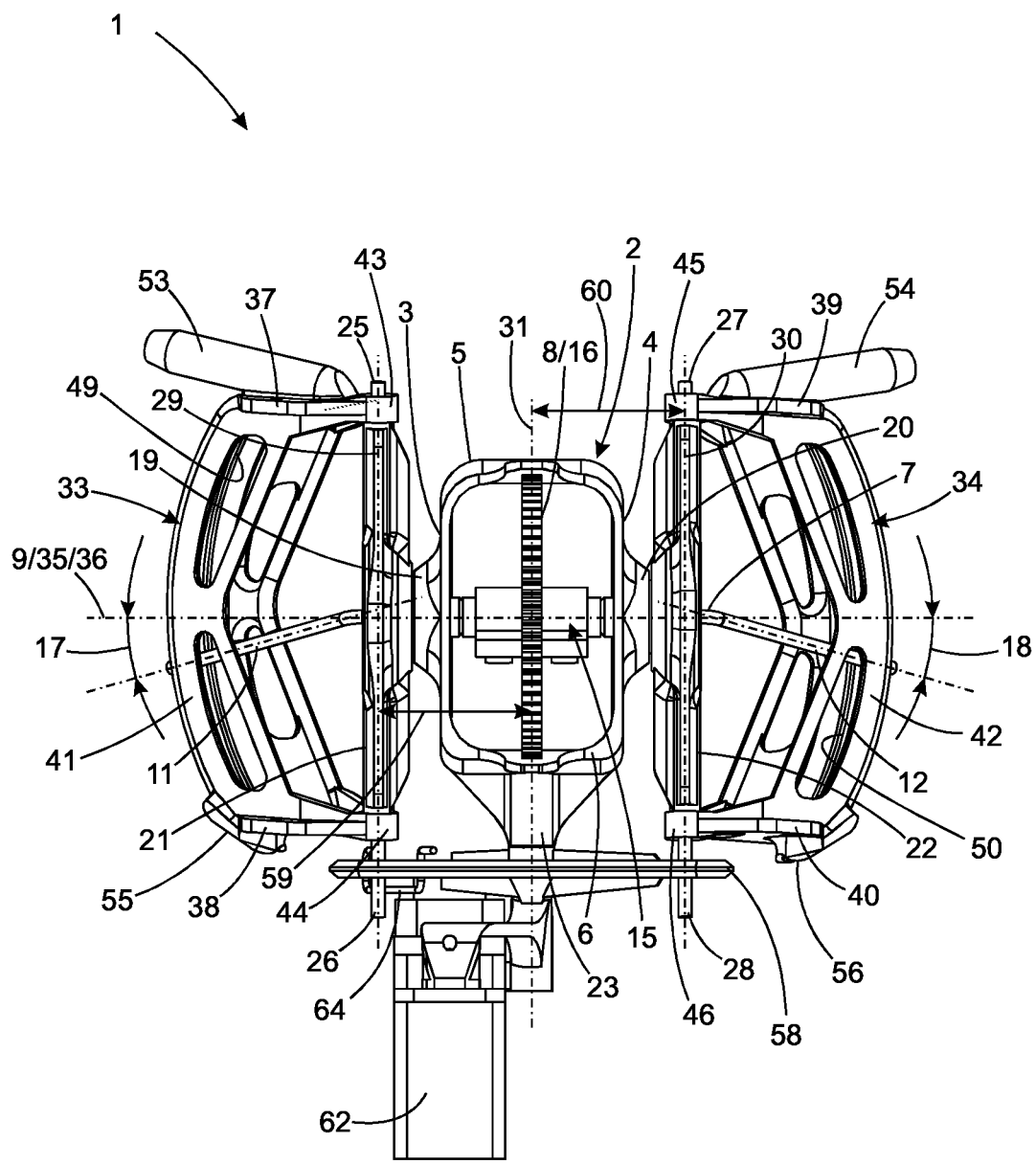
FIG. 2 a top view of the gear according to FIG. 1.
Figure 3:
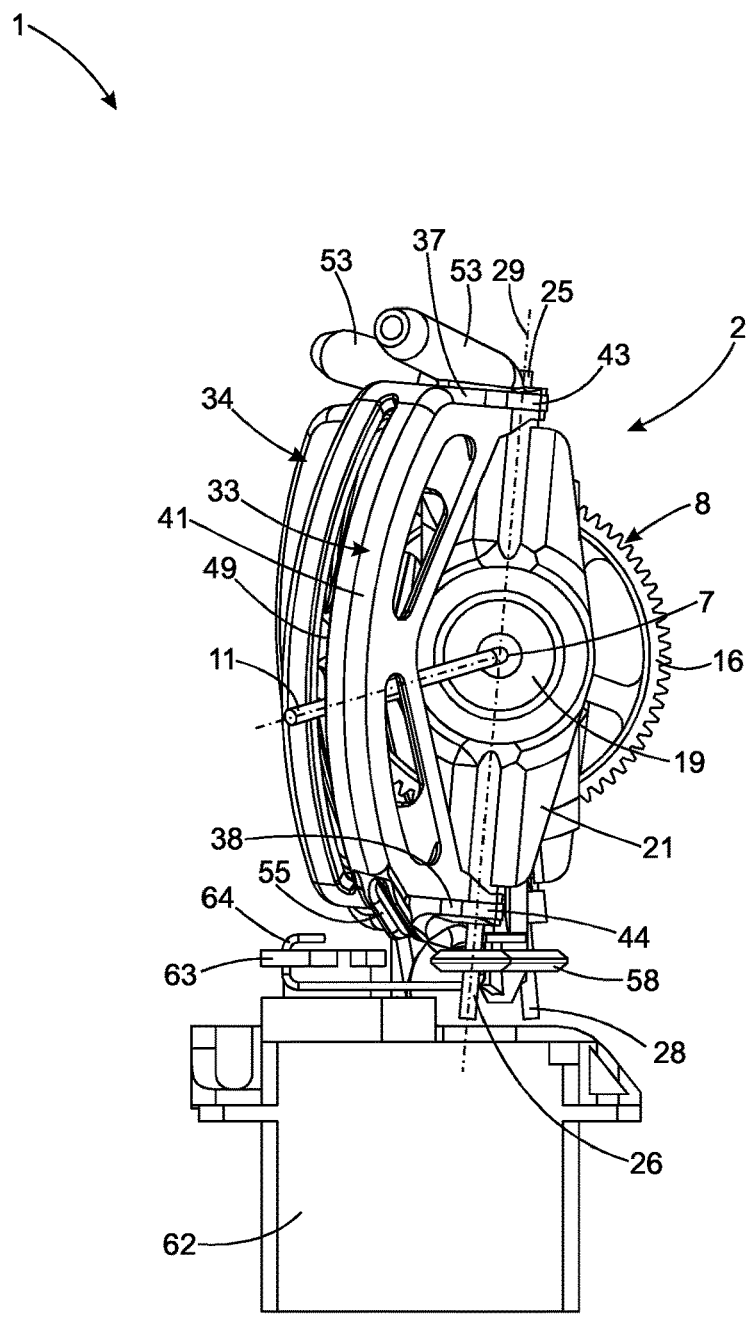
FIG. 3 a side view of the gear according to FIGS. 1 and 2.
Figure 4:
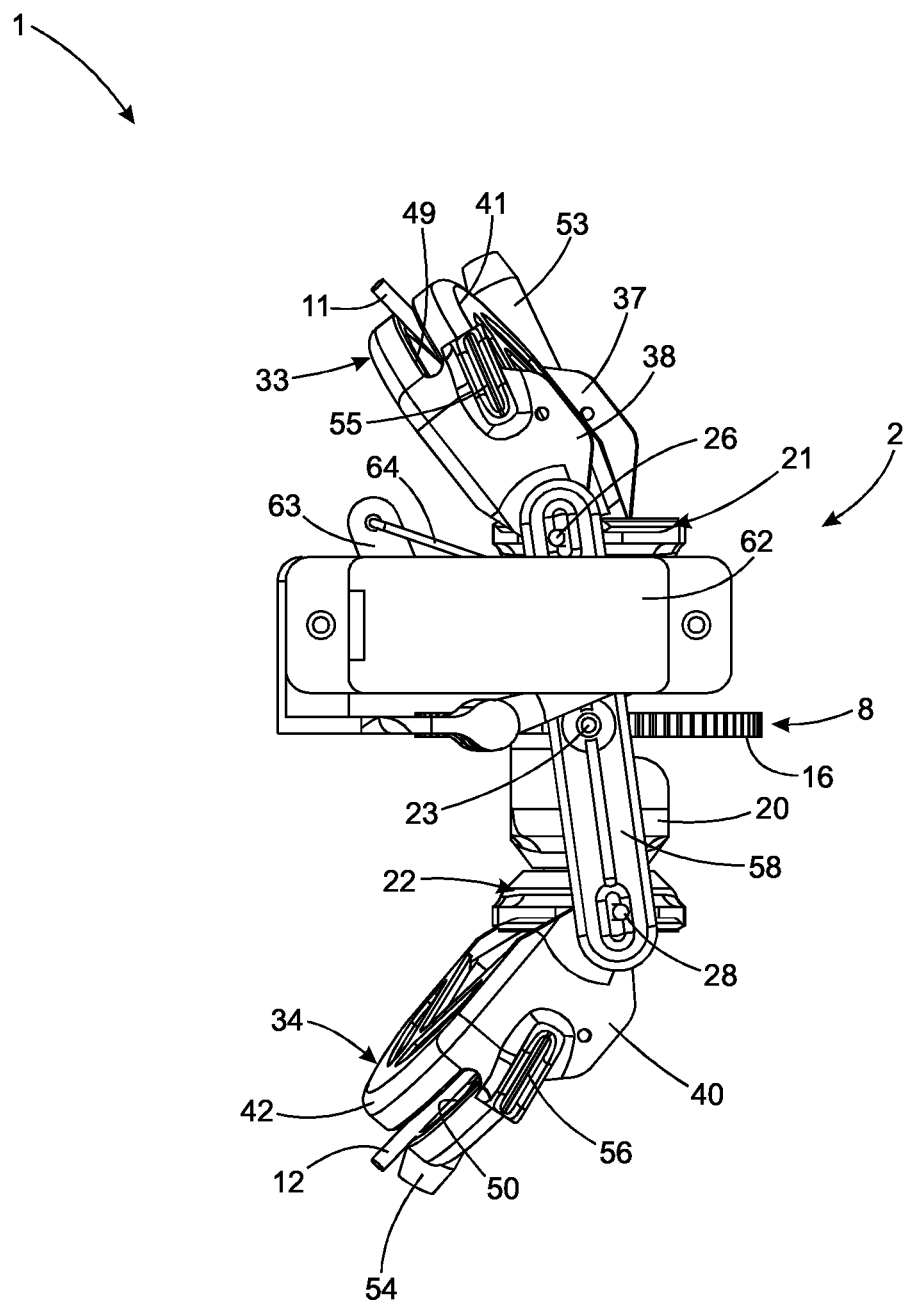
FIG. 4 a front view of the gear according to FIGS. 1 to 3.

Adjacent to the central section 15, the crankshaft 7 has a first end region 11 and a second end region 12, each of which is of rectilinear design and is angled at an arcuate angle 17, 18 to the gearwheel axis 9 relative to the central section 15, as can be seen in FIG. 2. Exemplarily, the center portion 15 and the first end portion 11 as well as the second end portion 12 are arranged in a common plane (not shown). It is further provided that the two acute angles 17, 18 have the same magnitude but different orientations. In the position of the crankshaft 7 as shown in FIG. 2 the first end region 11 is angled counterclockwise by angle 17 with respect to the gearwheel axis 9, while the second end region 12 is angled clockwise by angle 18 with respect to the gearwheel axis 9.

As can be further seen from the illustrations of FIGS. 1 and 2, extending from the first side wall 3 along the gearwheel axis 9 is a first bearing journal 19 which is preferably formed integrally (in one piece) with the first side wall 3. Furthermore, extending from the second side wall 4 along the gearwheel axis 9 in a direction opposite to the first bearing journal 19 is a second bearing journal 20 which is preferably formed integrally (in one piece) with the second side wall 4. Each of the two bearing journals 19, 20 is penetrated by the crankshaft 7 and carries a first joint support 21 and a second joint support 22, respectively, at an end region facing away from the respective first and second side wall 3, 4. Both the first joint support 21 and the second joint support 22 are each mounted on the respective first bearing journal 19 or second bearing journal 20 so as to be pivotable about a first support axis 35 or second support axis 36, respectively, which are aligned coaxially with the gearwheel axis 9 and can therefore perform pivoting movements in 2 mutually parallel pivoting planes (not shown).

The first joint support 21 is provided at opposed end regions with bearing pins 25, 26 which define a first pivot axis 29. Preferably it is provided that the first pivot axis 29 intersects the gearwheel axis 9. In particular the first pivot axis 29 is aligned at a right angle to the gearwheel axis 9. The second joint support 22 is provided at opposed end regions with bearing pins 27, 28 which define a second pivot axis 30. Preferably it is provided that the second pivot axis 30 intersects the gear wheel axis 9. In particular the second pivot axis 30 is aligned at a right angle to the gear wheel axis 9. In an embodiment of the gear not shown, it may be provided that the pivot axes 29, 30 are oriented at an angle different from 90 degrees to the gearwheel axis 9, respectively.

The first bearing pins 25, 26 serve to pivotally support a first joint part 33, which is profiled in a substantially U-shaped manner. For example it is provided that the first joint part 33 has two U-legs 37, 38 which are aligned parallel to one another and which are each provided at the end with a bearing sleeve 43, 44. The respective bearing sleeve 43, 44 surrounding the respective bearing pin 25 or 26, as a result of which a pivotable sliding bearing is formed respectively. The two U-legs 37, 38 are connected to one another by a first connecting section 41, which is arcuately formed in the manner of a circular ring section. A first guide slot 49, which is formed in the shape of a groove, penetrates the first connecting section 41. The first end region 11 of the crankshaft 7 engages in the first guide slot 49. The first guide slot 49 has a rectangular cross-section in a cross-sectional plane that is not shown and is aligned transversely with respect to the first end region 11. A first receiving sleeve 53 is formed on the first U-leg 37, which is designed to receive a supporting strut of a wing arrangement (not shown). A first receiving groove 55 is formed on the second U-leg 38, which is designed to receive a coupling strut of a wing arrangement (not shown).

The second joint part 34 is symmetrical to the first joint part 33 and is mounted in the same manner on the corresponding joint support 22.

A third bearing journal 23 is arranged on the rear wall 6 of the gearwheel support 2, which extends along a journal axis 31 which is aligned transversely to the gearwheel axis 9 and which intersects the gearwheel axis 9.

The third bearing journal 23 serves for the pivotally movable mounting of a coupling strut 58, through which the bearing pins 26 and 28 of the first joint support 21 and the second joint support 22 respectively pass at the ends. The coupling strut 58 serves for a pivotable coupling of the first joint support 21 with the second joint support 22. Preferably, it is provided that a first distance 59 between the first pivot axis 29 and the pivot axis 31 as well as a second distance 60 between the second pivot axis 30 and the pivot axis 31 are identical. Hence a pivoting movement of the coupling strut 58 about the pivot axis 31 leads to pivoting movements of the two joint supports 21, 22 in opposite directions with equal angular amounts and opposite pivoting directions.

To initiate a pivoting movement on the coupling strut 58 an actuator 62, in particular an electric geared motor is provided, which is fixed to the gearwheel support 2. The actuator 62 comprises a pivoted lever 63 which, when a suitable electrical signal is provided to the actuator 62, can be pivoted about a pivot axis which is not shown in greater detail and is aligned parallel to the journal axis 31. The pivoted lever 63, which is also referred to as a rudder horn, is motion-coupled to the coupling strut 58 via a push-pull rod 64, so that a pivoting motion of the pivoted lever 63 results in a corresponding pivoting motion of the coupling strut 58.

An intended use of the gear 1 can be described as follows:

The gear 1 is arranged in a fuselage of a flapping wing aircraft (not shown), wherein the joint parts 33, 34 are provided with wings (not shown). Furthermore, the gear 8 is brought into operative connection with a drive (not shown) and which may be, for example, an electric geared motor, so that a drive movement on the gear 8 is provided. It is further provided that the actuator 62 is connected to a control device (not shown), which may be a radio receiver of a radio remote control, wherein the actuator 62 is supplied with actuating signals by the radio receiver in order to be able to carry out a pivoting movement of the pivoting lever 63 and the coupling strut 58 coupled thereto.

When a driving movement is provided to the gear 8, a rotational movement of the crankshaft 7 about the gearwheel axis 9 occurs, in which the first and second end regions 11, 12 perform a movement. The movement of the first and second end regions 11, 12 defines a cone area, which is aligned coaxially with respect to the gearwheel axis 9. The first and second end regions 11, 12 of the crankshaft 7 engage in the respective first and second guide slots 49, 50 of the first and second joint members 33, 34 to ensure a coupling between the movement of the first second end regions 11, 12 and the first and second joint members 33, 34. Due to this coupling, each of the first and second joint members 33, 34 move with an oscillating pivoting movement about the respective first pivot axis 29 and second pivot axis 30. Preferably, the arcuate curvatures of the first connecting section 41 and of the second connecting section 42 are matched to the geometry of the crankshaft 7 and its first and second end regions 11, 12 in such a way that the first and second joint parts 33, 34 perform a pivoting movement with a sinusoidal velocity distribution as far as a constant crankshaft movement is provided.

It is assumed that the coupling strut 58 is initially aligned parallel to the gearwheel axis 9, resulting in a symmetrical distribution of force on the flapping wing aircraft when the wings are similarly configured and coupled to the respective first and second joint portions 33, 34. Preferably, the wings (not shown) are configured such that a resultant force on the flapping wing aircraft resulting from the sequence of upstroke movements and downstroke movements of the wings includes both a lift force component and a propulsion force component.

In order to enable an influence to be exerted on a direction of flight of the flapping wing aircraft a change in the spatial orientation of the first and second pivot axes 29, 30, which are initially aligned parallel to one another, can be made with the aid of the actuator 62. For this purpose, a pivoting movement is initiated by the actuator 62 on the coupling strut 58, resulting in a pivoting of the two first and second joint supports 21 and 22 in opposite directions, which results in different lift forces and propulsive forces at the respective wings associated with the first and second joint parts 33, 34. Accordingly, a spatial orientation of the force resulting on the flapping wing aircraft is changed thereby causing the desired change in direction for the flapping wing aircraft.

What is claimed is:

1. A gear for a flapping wing aircraft, comprising a gearwheel support, on which a gearwheel is rotatably mounted about a gearwheel axis, further comprising a crankshaft, which is non-rotatably connected to the gearwheel and which has a central section extending coaxially with the gearwheel axis and which has end regions, wherein the central section passes through the gearwheel and wherein the end regions delimit an angle between 0 degrees and 90 degrees with the central section, wherein each of the end regions is inserted into a guide slot of an associated joint part which is mounted on a joint support connected to the gearwheel support so as to be pivotable about a pivot axis, and wherein each of the joint supports is mounted on the gearwheel support so as to be pivotable about a respective support axis, wherein the joint supports are connected to a coupling strut, wherein an actuator for providing an actuating movement is arranged on the gearwheel support and is coupled to the coupling strut.

2. The gear according to claim 1, wherein the pivot axis delimits an angle in a range between 70 degrees and 90 degrees with the gearwheel axis or wherein the support axis delimits an angle in a range between 0 degrees and 30 degrees with the gearwheel axis or wherein the support axis is arranged parallel to the gearwheel axis.

3. The gear according to claim 1, wherein the coupling strut is arranged on a bearing journal of the gearwheel support so as to be pivotable about a journal axis which is aligned transversely to the gearwheel axis and which intersects the gearwheel axis.

4. The gear according to claim 3, wherein the actuator has a pivoted lever which is connected in an articulated manner to the coupling strut via a control strut.

5. The gear according to claim 1, wherein the gearwheel support is provided on mutually opposite outer surfaces with a respective bearing journal which is aligned parallel to the gearwheel axis and through which the crankshaft passes, and wherein the joint support is mounted pivotably on the bearing journal.

6. The gear according to claim 1, wherein the joint supports are accommodated on the gearwheel support at a fixed distance from one another and/or wherein the joint supports are accommodated on the gearwheel support so as to be exclusively pivotable.

7. The gear according to claim 1, wherein the associated joint part is mounted on the joint support so as to be exclusively pivotable about the pivot axis.

8. The gear according to claim 1, wherein the guide slot of the associated joint part is of groove-shaped design and is penetrated by the end region of the crankshaft, the guide slot having a rectangular cross-section in a cross-sectional plane aligned transversely to the end region.

9. The gear according to claim 8, wherein a cross-sectional plane aligned transversely to the pivot axis and comprising the gearwheel axis is at a distance from a center of the guide slot.

* * * * *